(12) United States Patent
Vik et al.

(10) Patent No.: US 10,099,735 B2
(45) Date of Patent: Oct. 16, 2018

(54) SYSTEM AND METHOD FOR MONITORING TRACK TENSION FOR A TRACK ASSEMBLY OF A WORK VEHICLE

(71) Applicant: CNH Industrial America, LLC, New Holland, PA (US)

(72) Inventors: Brian Vik, Barnesville, MN (US); Paul E. Wibbels, West Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/340,121

(22) Filed: Nov. 1, 2016

(65) Prior Publication Data
US 2018/0118290 A1    May 3, 2018

(51) Int. Cl.
*B62D 55/30* (2006.01)
*B62D 55/08* (2006.01)
*B62D 55/065* (2006.01)

(52) U.S. Cl.
CPC ............ *B62D 55/30* (2013.01); *B62D 55/08* (2013.01); *B62D 55/065* (2013.01)

(58) Field of Classification Search
CPC ...... B62D 55/30; B62D 55/08; B62D 55/065; B62D 55/305
USPC ................. 305/143, 144, 145, 148, 149, 154
See application file for complete search history.

(56) References Cited

U.S. PATENT DOCUMENTS

| 6,224,172 B1 | 5/2001 | Goodwin |
| 6,432,010 B1 * | 8/2002 | Palonis ................ B62D 55/305 |
| | | 188/322.19 |
| 6,782,960 B2 | 8/2004 | Kanzler et al. |
| 7,172,257 B2 * | 2/2007 | Tamaru ................... B62D 55/30 |
| | | 305/125 |
| 7,467,831 B2 * | 12/2008 | Bertoni ................... B62D 55/14 |
| | | 305/125 |
| 7,914,087 B2 | 3/2011 | Alfthan |
| 8,764,129 B2 | 7/2014 | Simula et al. |
| 8,838,324 B2 | 9/2014 | Suzuki et al. |

(Continued)

FOREIGN PATENT DOCUMENTS

WO    WO 2013/079530    6/2013

OTHER PUBLICATIONS

John Deere Manufacturing Company Manuals Track Adjustment, dated Jun. 17, 2009 (7 pages).

*Primary Examiner* — S. Joseph Morano
*Assistant Examiner* — Jean W Charleston
(74) *Attorney, Agent, or Firm* — Rickard K. DeMille; Rebecca L. Henkel

(57) ABSTRACT

A system for monitoring the track tension for a track assembly of a work vehicle may include a track tensioning assembly having a fluid-driven actuator. The actuator may be configured to adjust the track tension of the track assembly based on a fluid pressure of fluid within the actuator. The system may also include a wireless pressure sensor provided in operative association with the actuator that is configured to detect the fluid pressure within the actuator. Additionally, the system may include controller communicatively coupled to the wireless pressure sensor. The controller may be configured to monitor the fluid pressure within the actuator based on wireless pressure signals received from the wireless pressure sensor, wherein the monitored fluid pressure is indicative of the track tension for the track assembly.

10 Claims, 5 Drawing Sheets

(56) References Cited

U.S. PATENT DOCUMENTS

| | | | |
|---|---|---|---|
| 8,985,250 B1 | 3/2015 | Lussier et al. | |
| 2008/0224535 A1* | 9/2008 | Schmit | B62D 55/30 |
| | | | 305/145 |
| 2014/0144716 A1* | 5/2014 | Wirkus | B62D 55/305 |
| | | | 180/9.1 |
| 2015/0191173 A1 | 7/2015 | Lussier et al. | |
| 2015/0217818 A1* | 8/2015 | Vik | B62D 55/305 |
| | | | 305/125 |
| 2015/0218010 A1* | 8/2015 | Benavides | C02F 1/001 |
| | | | 210/741 |

* cited by examiner

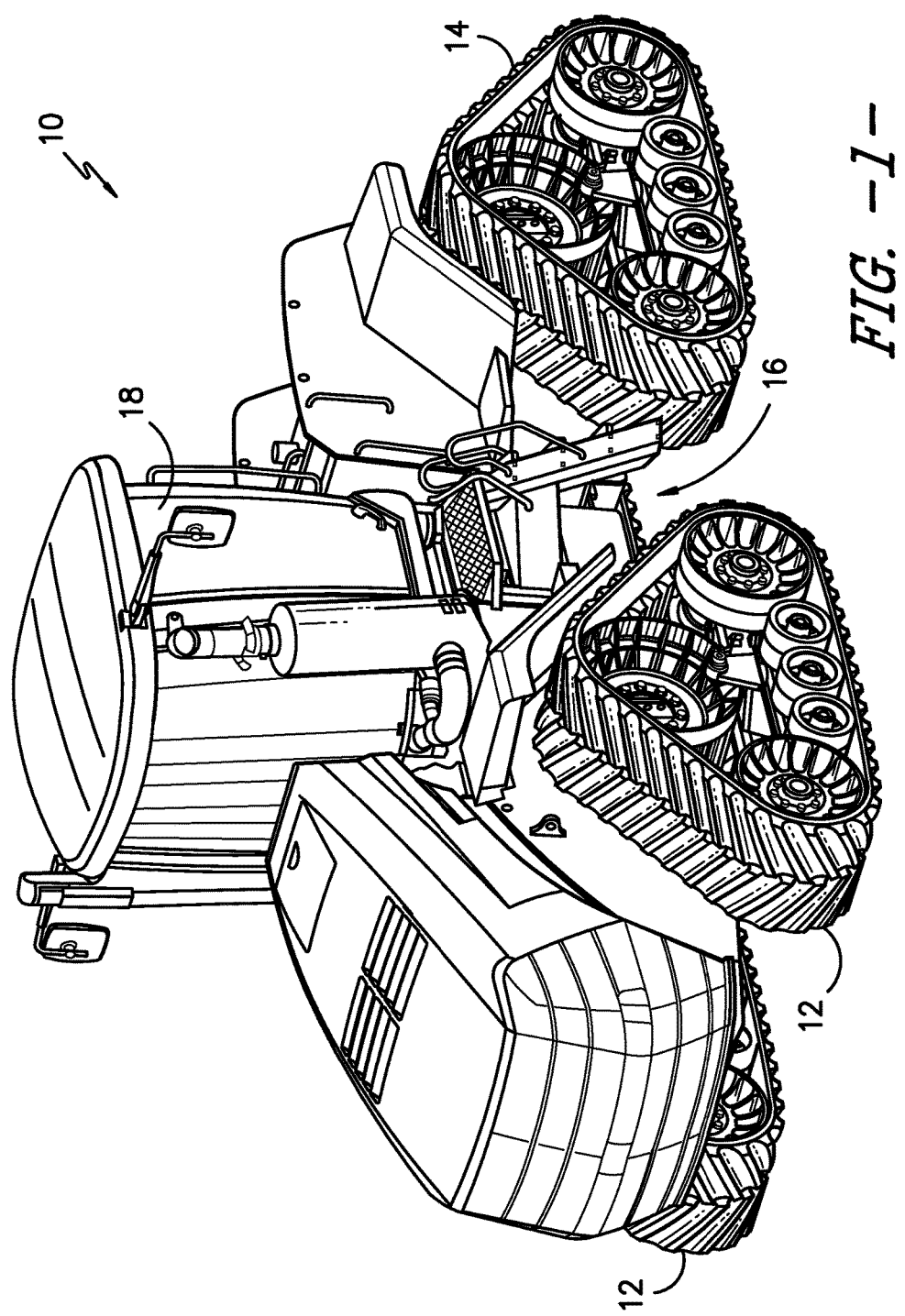
FIG. -1-

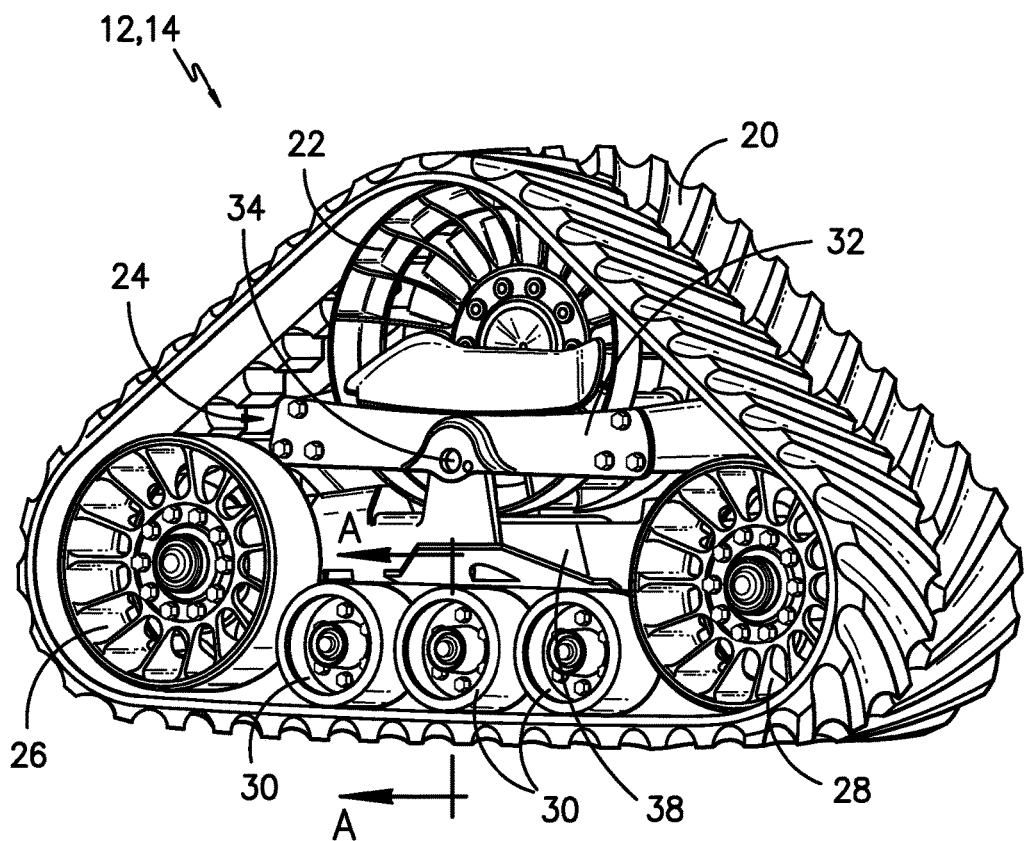
FIG. -2-

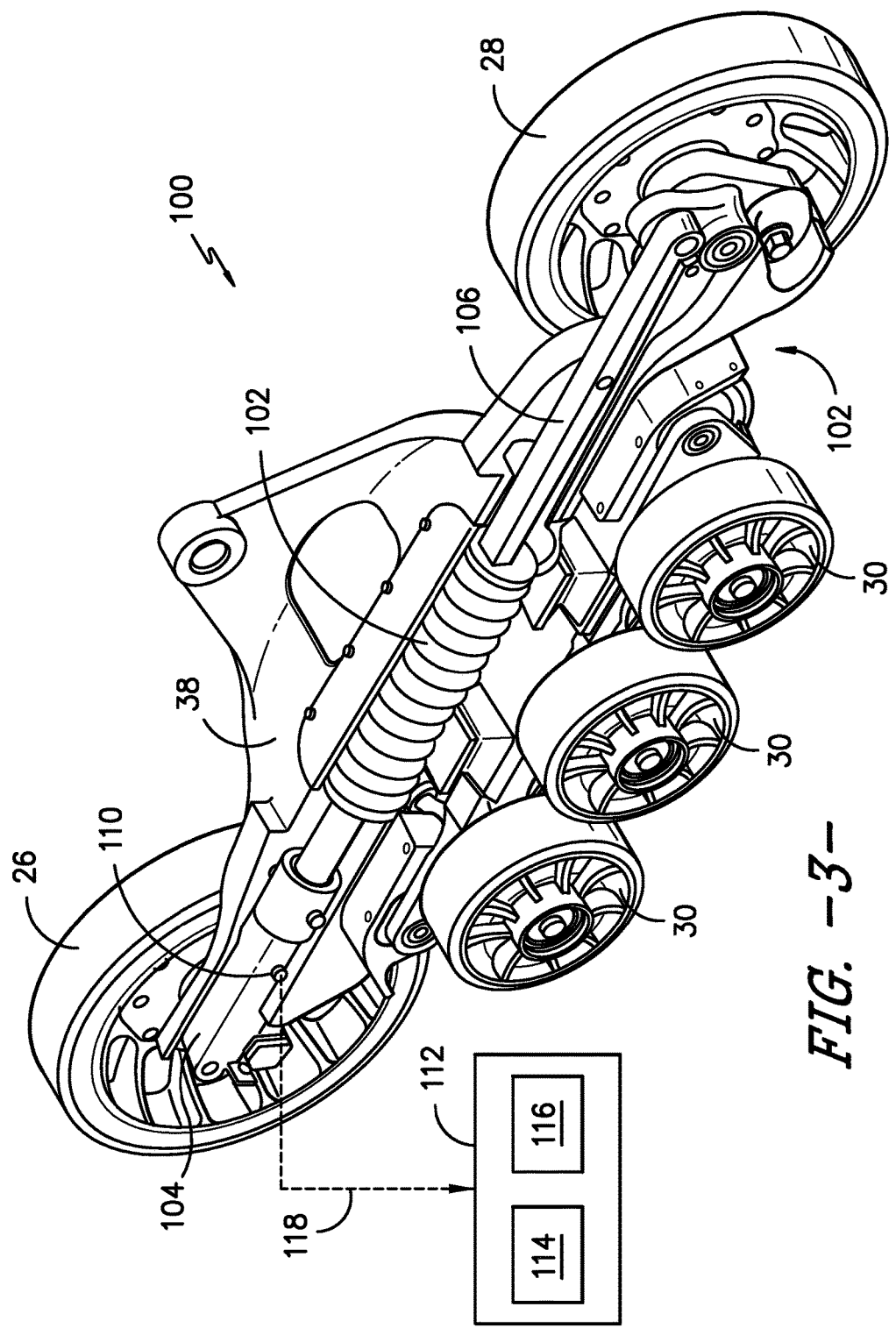
FIG. -3-

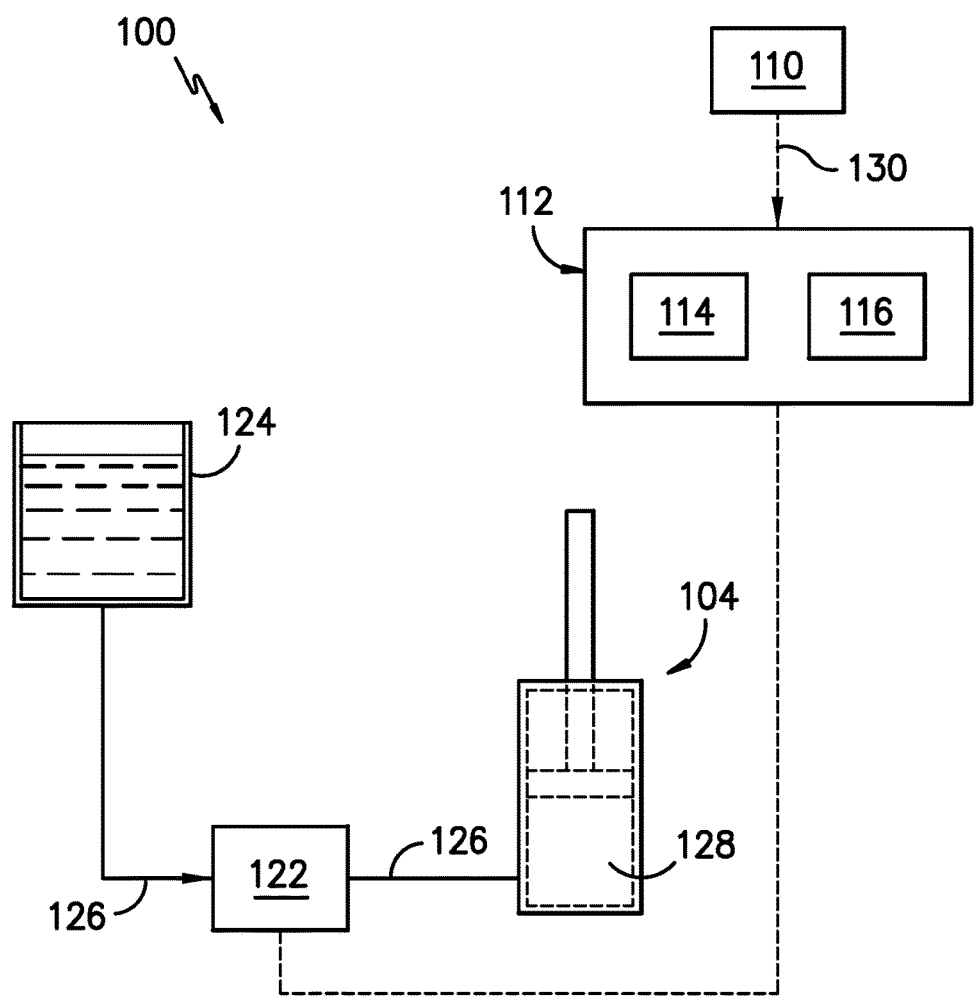
FIG. -4-

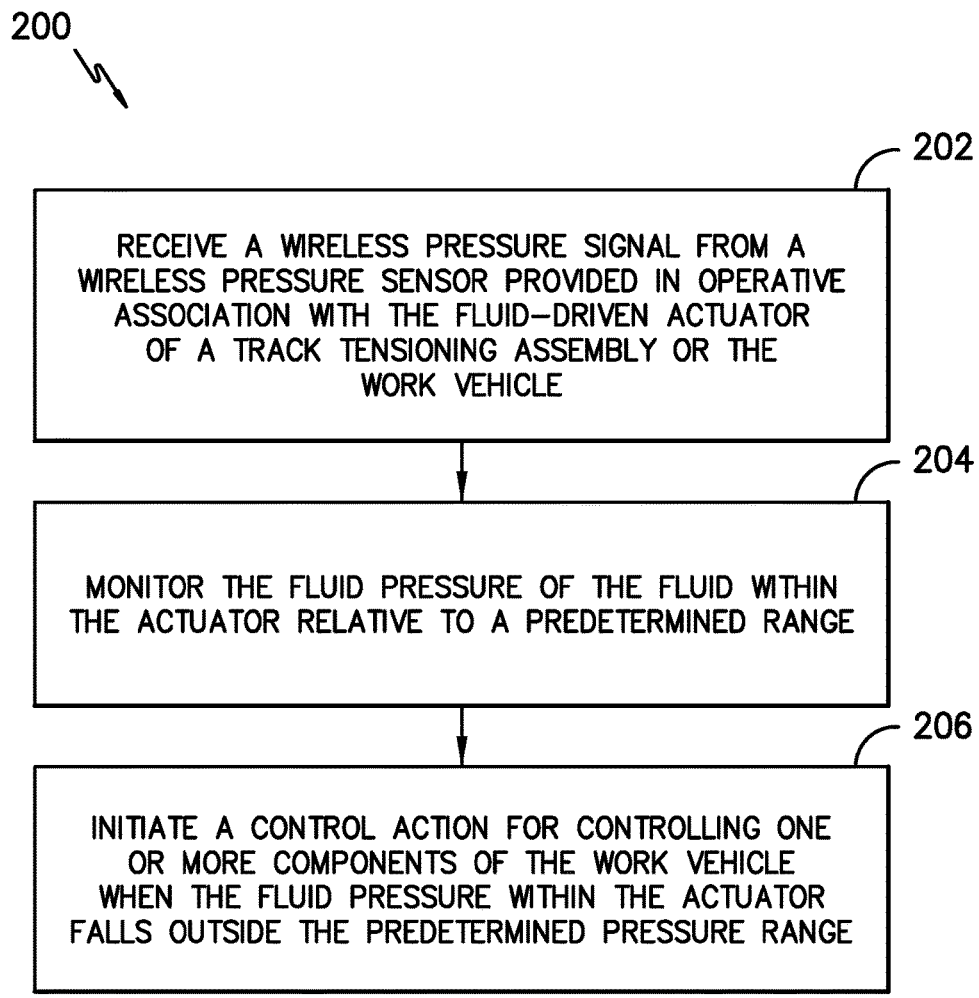
FIG. -5-

SYSTEM AND METHOD FOR MONITORING TRACK TENSION FOR A TRACK ASSEMBLY OF A WORK VEHICLE

FIELD OF THE INVENTION

The present subject matter relates generally to work vehicles and, more particularly, to improved systems and methods for wirelessly sensing the fluid pressure within a track tensioning assembly of a work vehicle to allow the track tension of the associated track assembly to be monitored.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For instance, for a four-wheel drive track-driven vehicle, a drive wheel of each front track assembly is typically rotationally coupled to a front axle assembly of the work vehicle for transferring torque transmitted from the engine to the front track assembly while a drive wheel of each rear track assembly is typically rotationally coupled to a rear axle assembly of the work vehicle for transferring torque transmitted from the engine to the rear track assembly. As is generally understood, each drive wheel may be configured to rotationally engage a corresponding endless track of the associated track assembly such that rotation of the drive wheel rotates the track, thereby allowing the vehicle to be driven forward or backward. In addition to the drive wheel, each track assembly may include a plurality of other track wheels, such as idler wheels and roller wheels that engage the track as it is rotates around its drive loop.

Due to the typical operating environment for a work vehicle, track assemblies are often exposed to mud, sticks and/or other debris, which can lead to accumulation of such material within one or more of the components of a track assembly. In particular, material may accumulate between the track and the track wheels. Such material accumulation may undesirably impact the tension within the track of the track assembly. Moreover, other operating conditions of a work vehicle, such as the vehicle load and/or the operating state of a track tensioning assembly of the track assembly, may impact the track tension of the vehicle's tracks.

Accordingly, an improved system and method for monitoring the track tension of a track assembly of a work vehicle to determine when the tension falls outside desired operating range would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring the track tension for a track assembly of a work vehicle. The system may include a track tensioning assembly having a fluid-driven actuator. The actuator may be configured to adjust the track tension of the track assembly based on a fluid pressure of fluid within the actuator. The system may also include a wireless pressure sensor provided in operative association with the actuator that is configured to detect the fluid pressure within the actuator. Additionally, the system may include a controller is communicatively coupled to the wireless pressure sensor. The controller may be configured to monitor the fluid pressure within the actuator based on wireless pressure signals received from the wireless pressure sensor, wherein the monitored fluid pressure is indicative of the track tension for the track assembly.

In another aspect, the present subject matter is directed to a method for monitoring the track tension for a track assembly of a work vehicle, wherein the track assembly includes a track tensioning assembly having a fluid-driven actuator. The method may include receiving, with a computing device, a wireless pressure signal from a wireless pressure sensor provided in operative association with the fluid-driven actuator, wherein the wireless pressure signal is associated with a fluid pressure of fluid within the actuator. The method also includes monitoring, with the computing device, the fluid pressure within the actuator relative to a predetermined pressure range. In addition, the method may include initiating, by the computing device, a control action for controlling one or more components of the work vehicle when the fluid pressure within the actuator falls outside the predetermined pressure range.

In a further aspect, the present subject matter is directed to a track assembly for a work vehicle. The track assembly may include a track and a drive wheel configured to rotationally drive the track. The track assembly may also include first and second idler wheels configured to contact an inner surface of the track, with the first idler wheel being spaced apart from second idler wheel. In addition, the track assembly may include a plurality of roller wheels spaced apart from the first and second idler wheels and a track tensioning assembly coupled between the first and second idler wheels. The track tensioning assembly may be configured to regulate an outward pressure applied by the first and second idler wheels against the inner surface of the track. The track tensioning assembly may include a fluid-driven actuator coupled to the first idler wheel and a linkage coupled to the second idler wheel. The track tensioning assembly may also include a spring positioned between the actuator and the linkage. Moreover, the track assembly may include a wireless pressure sensor provided in operative association with the actuator that is configured to measure a fluid pressure of fluid supplied within the actuator.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a work vehicle in accordance with aspects of the present subject matter;

FIG. 2 illustrates a perspective view of one embodiment of a track assembly suitable for use within the work vehicle shown in FIG. 1 in accordance with aspects of the present subject matter;

FIG. 3 illustrates a perspective view of one embodiment of a system for monitoring the track tension for a track assembly in accordance with aspects of the present subject matter;

FIG. 4 illustrates a schematic view of another embodiment of a system for monitoring the track tension for a track assembly in accordance with aspects of the present subject matter; and FIG. 5 illustrates a flow diagram of one embodiment of a method for monitoring the track tension for a track assembly in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring the track tension for a track assembly of a work vehicle. Specifically, in several embodiments, the disclosed system and method may monitor the track tension for the track assembly relative to a predetermined range to determine when the tension exceeds or drops below such operating range. For instance, the track tension may fall outside the predetermined range due to the accumulation of material within one or more of the components of the track assembly. Upon determining that the track tension is outside of the predetermined range, a controller of the work vehicle may be configured to initiate one or more suitable control actions designed to bring the track tension back within the desired operating range.

In accordance with aspects of the present subject matter, the track tension may be monitored using a wireless pressure sensor. Specifically, in several embodiments, the wireless pressure sensor may be provided in operative association with a fluid-driven actuator of each track tensioning assembly of the work vehicle. In such embodiments, the wireless pressure sensor may be configured to detect or monitor the fluid pressure of the fluid being supplied within the actuator. The fluid pressure may, in turn, be indicative of or otherwise related to the track tension for the track assembly.

In several embodiments, the wireless pressure sensor may be communicatively coupled to the vehicle's controller to allow the controller to actively monitor the fluid pressure and, thus, the track tension for the track assembly. Specifically, by monitoring the fluid pressure associated with the actuator of the track tensioning assembly, the controller may be configured to detect undesirably high or low levels of track tension for the track assembly, which could result in damage to the track assembly components or disengagement of the track from the track assembly. When such undesirable levels of track tension are detected, the controller may be configured to initiate one or more control actions associated with reducing the track tension of the track assembly. For instance, the controller may be configured to initiate control actions associated with reducing a ground speed and/or a torque of the work vehicle, adjusting the fluid pressure within the actuator of the track tensioning assembly, and/or transmitting a notification to an operator of the work vehicle.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like.

Referring now to FIG. 2, a perspective view of an exemplary embodiment of one of the track assemblies 12, 14 shown in FIG. 1 is illustrated in accordance with aspects of the present subject matter. As shown, the track assembly 12, 14 may generally include a track 20, a drive wheel 22 for mechanically engaging and rotationally driving the track 20, and a suspension system 24 for supporting the weight of the work vehicle 10 and for damping vibrations and other movement between the track 20 and the vehicle's chassis 16. In one embodiment, the suspension system 24 may include front and rear idler wheels 26, 28 about which the track 20 is wrapped and a plurality of roller wheels 30 for guiding the track 20 between the idler wheels 26, 28. Additionally, the suspension system 24 may include an undercarriage support beam 32 configured to support the idler wheels 26, 28 and the roller wheels 30 relative to the track 20. For example, as shown in FIG. 2, the undercarriage support beam 32 may extend fore-to-aft within the track assembly 12, 14 to allow the various wheels 26, 28, 30 to be coupled thereto.

As is generally understood, the undercarriage support beam 32 may be pivotally supported on the vehicle chassis 16 (FIG. 1) by two pivot pins, namely an outboard pivot pin 34 and an inboard pivot pin (not shown). The outboard pivot pin 34 is located outboard of the drive wheel 22, while the inboard pivot pin is located inboard of the drive wheel 22 and is secured on the vehicle chassis 16. In general, the outboard pivot pin 34 may be configured to be coupled between an undercarriage bearing support member 38 and the undercarriage support beam 32. For example, the pivot pin 34 may be configured to be received within both an opening (not shown) defined through the bearing support member 38 and a corresponding outboard opening (not shown) defined in the support beam 32. The bearing support member 38 may, in turn, be secured at each of its ends to support posts (not shown) coupled to the vehicle chassis 16. As such, the outboard pivot pin 34 may serve to pivotally couple the undercarriage support beam 32 to the chassis 16.

It should be appreciated that a similar pivotal support arrangement may also be provided on the vehicle chassis 16 inboard of the drive wheel 22 utilizing the inboard pivot pin. For example, the inboard pivot pin may be configured to be received within a suitable opening (not shown) defined in the undercarriage support beam 32 for pivotally coupling the support beam 32 to the chassis 16.

It should also be appreciated that the track assembly 12, 14 shown in FIG. 2 is simply illustrated to provide one example of a suitable track assembly configuration. In other embodiments, the track assembly 12, 14 may have any other suitable track-based configuration.

Referring now to FIG. 3, a perspective view of one embodiment of a system 100 for monitoring the track tension for a track assembly of a work vehicle is illustrated in accordance with aspects of the present subject matter. In general, the system 100 will be described herein with reference to the work vehicle and the track assembly 12, 14 described above with reference to FIGS. 1-2. However, it should be appreciated by those of ordinary skill in the art that the disclosed system 100 may generally be utilized with track assemblies 12, 14 having any other suitable track assembly configuration and/or work vehicles 10 having any other suitable vehicle configuration.

As shown, the system 100 may generally include a track tensioning assembly 102 coupled between the front and rear idler wheels 26, 28. In general, the track tensioning assembly 102 may be configured to regulate or control the tension within the track 20 of the track assembly 12, 14. As shown in FIG. 3, the track tensioning assembly 102 may include a fluid-driven actuator 104 coupled to the front idler wheel 26 and a mechanical linkage 106 coupled to the rear idler wheel 28. Additionally, a spring 108 may positioned between the actuator 104 and the linkage 106 to permit relative movement between such components. It should be appreciated that, in alternate embodiments, the actuator 104 may be coupled to the rear idler wheel 28 while the linkage 106 may be coupled to the front idler wheel 26, with the spring 108 being coupled between the actuator 104 and the linkage.

It should also be appreciated that the actuator 104 may generally correspond to any suitable fluid-driven actuator known in the art, such as a hydraulic actuator and/or a pneumatic actuator. Thus, in several embodiments, the actuator 104 may include both a cylinder configured to house a piston and rod coupled to the piston and extending outwardly from the cylinder. Additionally, in such embodiments, the actuator 104 may include a piston-side chamber and a rod-side chamber defined within the cylinder. As is generally, understood, by regulating the pressure of the fluid (e.g., hydraulic fluid or air) supplied to one or both of the cylinder chambers, the actuation of the rod may be controlled.

The track tensioning assembly 102 may be configured to regulate the track tension by controlling an outward pressure applied by the front and rear idler wheels 26, 28 against the inner surface of the track 20. More specifically, the actuator 104 may be configured to adjust the track tension based on the pressure of the fluid supplied to and/or within the actuator 104 (e.g., within one of the cylinder chambers of the actuator 104). For instance, by increasing the fluid pressure supplied within the actuator 104, the rod of the actuator 104 may be actuated in a manner that results in the front and rear idler wheels 26, 28 moving further apart from one another, thereby increasing the track tension within the track 20. Similarly, by decreasing the fluid pressure supplied within the actuator 104, the rod of the actuator 104 may be retracted in a manner that results in the front and rear idler wheels 26, 28 moving toward one another, thereby decreasing the track tension of the track assembly 12, 14.

In accordance with aspects of the present subject matter, the system 100 may also include a wireless pressure sensor 110 provided in operative association with the actuator 104. In general, the wireless pressure sensor 110 may be configured to detect or measure the pressure of the fluid supplied within the actuator 104. For example, in one embodiment, the wireless pressure sensor 110 may be provided in fluid communication with a fluid chamber defined within the actuator 104 (e.g., a piston-side chamber or a rod-side chamber of the actuator 104). Alternatively, the wireless pressure sensor 110 may be installed at any other suitable location that allows the sensor 110 to measure the pressure of the fluid supplied within the actuator 104, such as by installing the wireless pressure sensor 110 in fluid communication with a hose or conduit configured to supply fluid to the actuator 104.

It should be appreciated by those of ordinary skill in the art that the wireless pressure sensor 110 may generally correspond to any suitable pressure sensing device known in the art that is configured to communicate wirelessly with another component using any suitable wireless communication protocol. For instance, in one embodiment, the wireless pressure sensor 110 may include a wireless antenna associated therewith that allows pressure measurements from the sensor 110 to be transmitted wirelessly to another device.

Referring still to FIG. 3, the system 100 may include a controller 112 configured to electronically control the operation of one or more components of the work vehicle 10, such as the various components of the track tensioning assembly 102 (e.g., the actuator 104). In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 112 to perform various computer-implemented functions, such as one or more aspects of the method 200 described below with reference to FIG. 5. In addition, the controller 112 may also include various other suitable components, such as a communications circuit or module, one or more input/output channels, a data/control bus and/or the like.

It should be appreciated that the controller 112 may correspond to an existing controller of the work vehicle 10 or the controller 112 may correspond to a separate processing device. For instance, in one embodiment, the controller 112 may form all or part of a separate plug-in module that may be installed within the work vehicle 10 to allow for the disclosed system and method to be implemented without requiring additional software to be uploaded onto existing control devices of the vehicle 10.

In several embodiments, the controller 112 may be configured to actively monitor the track tension within the track 20 of the track assembly 12, 14 of the work vehicle 10. Specifically, in several embodiments, the controller 112 may be communicatively coupled to the wireless pressure sensor 110 via a wireless connection to allow wireless pressure signals (e.g., indicated by dashed line 118 in FIG. 3) to be transmitted from the sensor 110 to the controller. The controller 112 may then be configured determine or estimate the track tension within the track 20 based on the wireless pressure signals 118 received from the sensor 110. For instance, the controller 112 may include a look-up table or suitable mathematical formula stored within its memory 116 that correlates the pressure measurements to the track tension.

As indicated above, in several embodiments, the controller 112 may be configured to monitor the fluid pressure supplied within the actuator 104 relative to one or more desired pressure ranges. For instance, upon receiving the wireless pressure signals 118 from the sensor 110, the controller 112 may be configured to compare the monitored fluid pressure to a predetermined pressure range defined for the track tensioning assembly 102. Thereafter, in the event that the monitored fluid pressure exceeds the maximum operating pressure or limit for the pressure range or falls below the minimum operating pressure or limit for the pressure range (thereby indicating that the track tension may be too high or too low), the controller 112 may be configured to initiate a control action associated with reducing the track tension within the track 20. For instance, in one embodiment, the controller 112 may be configured to transmit a notification to the operator of the work vehicle 10 (e.g., by causing a visual or audible notification or indicator to be presented to the operator within the cab 18) that provides an indication that the track tension may be outside the desired operating range for the track 20. In such instance, the operator may then choose to initiate any suitable corrective action he/she believes is necessary, such as by reducing the ground speed and/or the torque of the work vehicle 0. Alternatively, the controller 112 may be configured to automatically control the operation of one or more components of the work vehicle 10 (e.g., the vehicle's engine or transmission) in a manner that reduces the ground speed and/or the torque of the work vehicle 10 when the monitored fluid pressure falls outside the predetermined pressure range, such as by reducing or limiting the engine power output. In even further embodiments, the controller 112 may be configured to initiate any other suitable control action. For instance, as will be described below with reference to FIG. 4, the controller 112 may be configured to automatically adjust the pressure of the fluid supplied to the actuator 104 so as to bring the fluid pressure back within the predetermined pressure range.

In a particular embodiment, the controller 112 may be configured to adjust its response to the monitored fluid pressure based on the amount that the fluid pressure differs from a desired system pressure for the track tensioning assembly 102. For instance, the controller 112 may be configured to monitor the fluid pressure relative to both a first, relatively narrow predetermined pressure range and a second, relatively wider predetermined pressure range. In such an embodiment, the predetermined pressure ranges may be defined relative to the desired system pressure such that each pressure range incorporates the desired system pressure. For instance, as a simple non-limiting example, for a desired system pressure of 3000 pounds per square inch (psi), the first predetermined pressure range may range from about 2500 psi to 5000 psi while the second predetermined pressure range may range from about 2000 psi to about 10,000 psi.

By monitoring the fluid pressure relative to both pressure ranges, the controller 112 may be configured to initiate differing control actions depending on where the monitored fluid pressure falls relative to each pressure range. For instance, the controller 112 may be configured to implement a first control action when the monitored fluid pressure falls outside the first predetermined pressure range and a second control action when the fluid pressure falls outside the second predetermined range. In such an embodiment, the control actions implemented by the controller 112 may vary depending on the specific range of pressures covered by each pressure range. For instance, when the first predetermined pressure range corresponds to the narrower pressure range, the control action implemented when the fluid pressure falls outside such range may be conservative or relatively minor, such as by transmitting a notification to the operator. Similarly, when the second predetermined pressure range corresponds to the wider pressure range, the control action implemented when the fluid pressure falls outside such range may be more aggressive, such as by automatically reducing the ground speed and/or the torque of the work vehicle 10.

Referring now to FIG. 4, a schematic diagram of an alternative embodiment of the system 100 described above with reference to FIG. 3 is illustrated in accordance with aspects of the present subject matter. It should be appreciated that, in the illustrated embodiment, the actuator 104 correspond to a hydraulic cylinder. However, as indicated above, the actuator 104 also correspond to any other suitable fluid-drive actuator, such as a pneumatic actuator.

As shown in FIG. 4, the controller 112 may, in several embodiments, be configured to be coupled to suitable components for automatically controlling the operation of the actuator 104 of the track tensioning assembly 102, thereby allowing the controller 112 to actively adjust the track tension for the track assembly 12, 14. For example, in the illustrated embodiment, the controller 112 may be communicatively coupled to a suitable pressurize regulating valve 122 (PRV) (e.g., a solenoid-activated valve) configured to regulate the pressure of hydraulic fluid supplied to the actuator 104 (e.g., from a hydraulic fluid tank 124 or pump of the work vehicle 10 via one or more fluid conduits 126). Specifically, as shown schematically in FIG. 4, the controller 112 may be coupled to a PRV 122 configured to regulate the pressure of the hydraulic fluid supplied to a cap or piston end 128 of the actuator 104. The PRV 122 may, in turn, be in fluid communication with the one or more conduits 126. In such an embodiment, the pressure of the fluid supplied from the PRV 122 may be directly proportional to the pressure supplied at the piston end 128 of the actuator 104, thereby allowing the controller 112 to control the displacement of the actuator 104. It should be appreciated that, although FIG. 4 only illustrates the controller 112 coupled to a suitable PRV for controlling the operation of the actuator 104 for one of the track assemblies 12, 14, similar hydraulic components may be utilized to control the other actuators 104 for the other track assemblies 12, 14.

Utilizing the system configuration shown in FIG. 4, the controller 112 may be configured to automatically control the operation of each actuator 104 so to maintain a desired track tension for each track assemblies 12, 14. Specifically, as indicated above, the controller 112 may monitor the fluid pressure supplied to the actuator 104 relative to a predetermined pressure range(s) by comparing the wireless pressure measurement signals 118 received from the wireless pressure sensor 110 to such range(s). When the fluid pressure within the actuator 104 falls outside of the predetermined pressure range, the controller 112 may be configured to electronically control operation of the PRV 122 to adjust the fluid pressure supplied within the actuator 104. For example, the controller 112 may be configured to monitor the fluid pressure within the actuator 104 relative to a maximum pressure threshold defining the top end of the predetermined pressure range. If the fluid pressure exceeds the maximum pressure threshold, the controller 112 may be configured to control the operation of the PRV 122 such that the fluid pressure supplied to the actuator 104 is reduced. Similarly, the controller 112 may be configured to monitor the fluid pressure within the actuator 104 relative to a minimum pressure threshold defining the bottom end of the predetermined pressure range. If the fluid pressure falls below the minimum pressure threshold, the controller 112 may be configured to control the operation of the PRV 122 such that the fluid pressure supplied to the actuator 104 is increased.

Referring now to FIG. 5, a flow diagram of one embodiment of a method 200 for monitoring the track tension for a track assembly of a work vehicle is illustrated in accordance with aspects of the present subject matter. In general, the method 200 will be described herein with reference to the work vehicle 10, the track assemblies 12, 14, and the system 100 described above with reference to FIGS. 1-4. However, it should be appreciated by those of ordinary skill in the art that the disclosed method 200 may generally be utilized to monitor the track tension for work vehicles having any other suitable vehicle configuration, for track assemblies having any suitable other track assembly configuration, and/or for computer-based systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include receiving a wireless pressure signal from a wireless pressure sensor provided in operative association with a fluid-driven actuator of a track tensioning assembly of the work vehicle. For instance, as indicated above, the controller 112 may be communicatively coupled to the wireless pressure sensor 110. As such, wireless pressure signals 118 transmitted from the pressure sensor 110 may be received by the controller 12 for subsequent processing of the associated pressure measurements.

Additionally, at (204), the method 200 may include monitoring the fluid pressure of the fluid within the actuator 104 relative to a predetermined range. Specifically, as indicated above, the controller 112 may be configured to compare the monitored fluid pressure to one or more predetermined pressure ranges. For instance, the controller 112 may be configured to compare the monitored fluid pressure to a single pressure range or two or more nested pressure ranges.

Moreover, as shown in FIG. 5, at (206), the method 200 may include initiating a control action for controlling one or more components of the work vehicle when the fluid pressure within the actuator falls outside the predetermined pressure range. For instance, as indicated above, the controller 112 may, in one embodiment, be configured to control one or more operator-interface components located within the vehicle's cab to allow a visual and/or audible notification to be presented to the operator. In addition, or as an alternative thereto, the controller 112 may be configured to automatically initiate a control action that results in the ground speed and/or the torque of the work vehicle 10 being reduced, such as by automatically controlling the operation of the vehicle's engine and/or transmission. Moreover, as described above with reference to FIG. 4, the controller 112 may also be configured to actively regulate the pressure of the fluid supplied within the actuator 104 (e.g., by electronically controlling the associated PRV 122). As indicated above, the controller may also be configured to select which control action should be implemented based on comparing the fluid pressure to two or more nested ranges, such as by implementing a first control action when the fluid pressure falls outside a first, narrower pressure range and by implementing a second control action when the fluid pressure falls outside a second, wider pressure range.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring track tension for a track assembly of a work vehicle, the system comprising:
   a track tensioning assembly including a fluid-driven actuator, the actuator being configured to adjust the track tension of the track assembly based on a fluid pressure of fluid within the actuator;
   a wireless pressure sensor provided in operative association with the actuator, the wireless pressure sensor being configured to detect the fluid pressure within the actuator; and
   a controller communicatively coupled to the wireless pressure sensor, the controller being configured to:
      monitor the fluid pressure within the actuator based on wireless pressure signals received from the wireless pressure sensor;
      monitor the fluid pressure within the actuator relative to a predetermined pressure range; and
      initiate a control action associated with reducing the track tension of the track assembly when the fluid pressure falls outside the predetermined pressure range,
   wherein the fluid pressure within the actuator is indicative of the track tension for the track assembly.

2. The system of claim 1, wherein the control action corresponds to at least one of a control action associated with reducing at least one of a ground speed or a torque of the work vehicle or a control action associated with adjusting the fluid pressure within the actuator.

3. The system of claim 1, wherein the track assembly includes a first idler wheel and a second idler wheel, the track tensioning assembly being coupled between the first and second idler wheels.

4. A system for monitoring track tension for a track assembly of a work vehicle, the system comprising:

a track tensioning assembly including a fluid-driven actuator, the actuator being configured to adjust the track tension of the track assembly based on a fluid pressure of fluid within the actuator;

a wireless pressure sensor provided in operative association with the actuator, the wireless pressure sensor being configured to detect the fluid pressure within the actuator; and a controller communicatively coupled to the wireless pressure sensor, the controller being configured to monitor the fluid pressure within the actuator based on wireless pressure signals received from the wireless pressure sensor, wherein the controller is further configured to monitor the fluid pressure within the actuator relative to a predetermined pressure range, wherein the fluid pressure within the actuator is indicative of the track tension for the track assembly, and wherein the controller is configured to transmit a notification to an operator of the work vehicle when the fluid pressure within the actuator falls outside the predetermined pressure range.

5. A system for monitoring track tension for a track assembly of a work vehicle, the system comprising:

a track tensioning assembly including a fluid-driven actuator, the actuator being configured to adjust the track tension of the track assembly based on a fluid pressure of fluid within the actuator;

a wireless pressure sensor provided in operative association with the actuator, the wireless pressure sensor being configured to detect the fluid pressure within the actuator; and a controller communicatively coupled to the wireless pressure sensor, the controller being configured to monitor the fluid pressure within the actuator based on wireless pressure signals received from the wireless pressure sensor, wherein the controller is further configured to monitor the fluid pressure within the actuator relative to a predetermined pressure range, wherein the fluid pressure within the actuator is indicative of the track tension for the track assembly, and wherein the predetermined pressure range corresponds to a first predetermined pressure range, the controller being configured to monitor the fluid pressure within the actuator relative to both the first predetermined pressure range and a second predetermined pressure range, the controller being configured to implement a first control action when the fluid pressure falls outside the first predetermined pressure range and a second control action when the fluid pressure falls outside the second predetermined range, the first control action differing from the second control action.

6. The system of claim 5, wherein the first control action corresponds to a control action associated with transmitting a notification to an operator of the work vehicle and the second control action corresponds to a control action associated with reducing at least one of a vehicle speed or a torque of the work vehicle.

7. A system for monitoring track tension for a track assembly of a work vehicle, the system comprising:

a track tensioning assembly including a fluid-driven actuator, the actuator being configured to adjust the track tension of the track assembly based on a fluid pressure of fluid within the actuator;

a wireless pressure sensor provided in operative association with the actuator, the wireless pressure sensor being configured to detect the fluid pressure within the actuator;

a controller communicatively coupled to the wireless pressure sensor, the controller being configured to monitor the fluid pressure within the actuator based on wireless pressure signals received from the wireless pressure sensor;

a conduit fluidly coupled to the actuator for supplying the fluid to the actuator; and a valve provided in operative association with the conduit, the valve being configured to regulate the fluid pressure of the fluid supplied to the actuator via the conduit, wherein the fluid pressure within the actuator is indicative of the track tension for the track assembly, and wherein the controller is configured to electrically control an operation of the valve based on the wireless pressure signals received from the wireless pressure sensor.

8. The system of claim 7, wherein the controller is configured to monitor the fluid pressure within the actuator relative to a maximum pressure threshold, the controller being configured to control the operation of the valve when the fluid pressure exceeds the maximum pressure threshold such that the fluid pressure supplied to the valve is reduced.

9. The system of claim 7, wherein the controller is configured to monitor the fluid pressure within the actuator relative to a minimum pressure threshold, the controller being configured to control the operation of the valve when the fluid pressure falls below the minimum pressure threshold such that the fluid pressure supplied to the valve is increased.

10. A track assembly for a work vehicle, the track assembly comprising:

a track;

a drive wheel configured to rotationally drive the track;

first and second idler wheels configured to contact an inner surface of the track, the first idler wheel being spaced apart from second idler wheel;

a plurality of roller wheels spaced apart from the first and second idler wheels and being configured to contact the inner surface of the track;

a track tensioning assembly coupled between the first and second idler wheels, the track tensioning assembly being configured to regulate an outward pressure applied by the first and second idler wheels against the inner surface of the track, the track tensioning assembly including a fluid-driven actuator coupled to the first idler wheel and a linkage coupled to the second idler wheel, the track tensioning assembly further including a spring positioned between the actuator and the linkage; and a wireless pressure sensor provided in operative association with the actuator, the wireless pressure sensor being configured to measure a fluid pressure of fluid supplied within the actuator;

a controller communicatively coupled to the wireless pressure sensor, the controller being configured to monitor the fluid pressure within the actuator based on wireless pressure signals received from the wireless pressure sensor;

a conduit fluidly coupled to the actuator for supplying the fluid to the actuator; and a valve provided in operative association with the conduit, the valve being configured to regulate the fluid pressure of the fluid supplied to the actuator via the conduit, wherein the controller is configured to electrically control an operation of the valve based on the wireless pressure signals received from the wireless pressure sensor.

* * * * *